United States Patent
Olsson

(10) Patent No.: US 8,366,802 B2
(45) Date of Patent: Feb. 5, 2013

(54) CYCLONE WITH IMPROVED SEPARATION OF GAS FROM GAS LADEN LIQUID STREAMS ALSO AT REDUCED FLOW VOLUMES

(75) Inventor: Krister Olsson, Karlstad (SE)

(73) Assignee: Metso Paper Sweden AB, Sundsvall (SE)

( * ) Notice: Subject to any disclaimer, the term of this patent is extended or adjusted under 35 U.S.C. 154(b) by 265 days.

(21) Appl. No.: 13/002,653

(22) PCT Filed: Jul. 14, 2008

(86) PCT No.: PCT/SE2008/000450
§ 371 (c)(1),
(2), (4) Date: Feb. 5, 2011

(87) PCT Pub. No.: WO2010/008325
PCT Pub. Date: Jan. 21, 2010

(65) Prior Publication Data
US 2011/0185894 A1    Aug. 4, 2011

(51) Int. Cl.
*B01D 19/00* (2006.01)
(52) U.S. Cl. ............ 95/1; 95/242; 95/261; 96/177; 96/211; 96/156
(58) Field of Classification Search .......... 95/242, 95/261, 1; 96/177, 211, 156
See application file for complete search history.

(56) References Cited

U.S. PATENT DOCUMENTS

| | | | | |
|---|---|---|---|---|
| 2,377,721 A | * | 6/1945 | Scott | 209/726 |
| 3,163,508 A | * | 12/1964 | Tuck et al. | 95/242 |
| 3,516,551 A | * | 6/1970 | Neumann et al. | 210/512.1 |
| 3,744,220 A | * | 7/1973 | Klein | 96/372 |
| 4,225,325 A | * | 9/1980 | Diehl et al. | 96/208 |
| 4,795,561 A | * | 1/1989 | Aslin | 210/512.1 |
| 5,669,948 A | * | 9/1997 | Brottg.ang.rdh et al. | 55/459.1 |
| 5,879,422 A | * | 3/1999 | Brottg.ang.rdh et al. | 55/325 |
| 6,294,001 B1 | * | 9/2001 | Hyppanen et al. | 95/271 |
| 6,629,821 B1 | * | 10/2003 | Yokota et al. | 417/199.1 |

FOREIGN PATENT DOCUMENTS

WO     WO8404702 A1 * 12/1984
WO     WO 0218057 A1 * 3/2002

* cited by examiner

*Primary Examiner* — Duane Smith
*Assistant Examiner* — Douglas Theisen
(74) *Attorney, Agent, or Firm* — Rolf Fasth; Fasth Law Offices

(57) ABSTRACT

The cyclone is for separating gas from a gas laden liquid stream by pressure reduction of the liquid stream. The cyclone has a cylindrical casing, having a tangentially directed inlet arrangement for the gas laden liquid stream, a lower outlet line for liquid and an upper outlet line for vapor and gas. The inlet arrangement is connected to a common supply source ($BL_{PR}$), and has at least two insertion pipes. The flow in at least one of these insertion pipes is controlled by at least one valve that depends upon an order of flow from the common supply source to maintain a flow velocity above a critical value.

Figure 1:
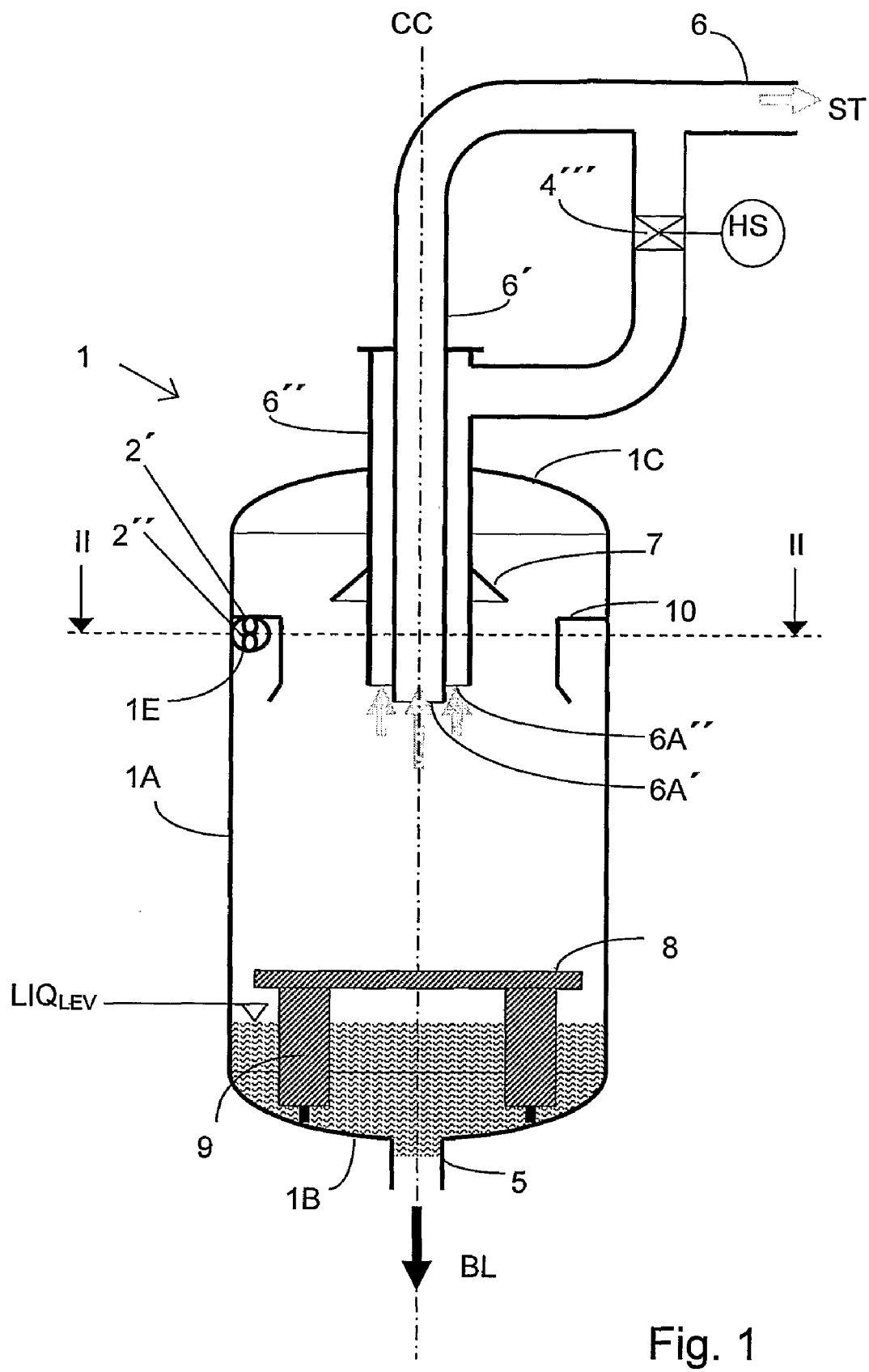

10 Claims, 2 Drawing Sheets

CYCLONE WITH IMPROVED SEPARATION OF GAS FROM GAS LADEN LIQUID STREAMS ALSO AT REDUCED FLOW VOLUMES

PRIOR APPLICATION

This application is a U.S. national phase application that claims priority from International Application No. PCT/SE2008/000450, filed 14 Jul. 2008.

FIELD OF THE INVENTION

The following invention relates to a cyclone, mainly for separating gas/vapour from a pressurised gas laden liquid stream, which separation is obtained by pressure reduction of the gas laden liquid stream. The gas laden liquid stream is preferably pressurised spent cooking liquid obtained from a digester used in pulp production. The cyclone comprises a cylindrical casing, an tangential inlet arrangement for the pressurised gas laden liquid stream, and in opposite ends of the cylindrical casing an outlet line for liquid and an outlet line for vapour and/or gas. Said inlet arrangement being connected to a supply line with at least one valve. The invention relates to a cyclone of the abovementioned type which is cost-effective and which can in a flexible manner be controlled during operation with regard to different operating conditions. The invention also relates to a method for counteracting foam formation.

BACKGROUND OF THE INVENTION

Cyclones are used in the main for separating a gas/vapour phase from a liquid phase. In industry today, use is in general made of cyclones which are specially manufactured with regard to the operating conditions in which the cyclone is principally to work. Furthermore, cyclones known today are in most cases constructed in such a manner that they cannot be adapted to different operating conditions, at least not without a considerable effort, as a result of which they often, in the event of a change in the production process, come to be used in operating conditions which are not optimum.

U.S. Pat. No. 2,377,721, U.S. Pat. No. 3,516,551 and U.S. Pat. No. 4,225,325, for example, show that this last-mentioned problem has been known for a long time and that there is a number of proposals for solutions of said problem. Common to these known solutions is that the flow variations are compensated in close proximity of the actual inlet into the cyclone by, in the case of a small flow, reducing the flowthrough area by a throttling member in the inlet arrangement of the cyclone so that the inlet rate is kept almost constant in order to obtain an optimum separation. In the case of liquids with a tendency to foam such a solution proves to have undesirable disadvantages, since the throttling gives rise to a change in the flow pattern and causes a pressure drop which in turn, because of the vapour formation etc., leads to an uneven flow pattern in connection with the outflow inside the cyclone and is thus a cause of foam formation. Foam formation is very disadvantageous since it disturbs the flow conditions inside the cyclone and thus counteracts optimum operating conditions.

In U.S. Pat. No. 5,879,422 and U.S. Pat. No. 5,669,948 are shown an example for establishing correct flow conditions to a cyclone, where the inlet pipe is equipped with an interchangeable insertion pipe and thus adaptable to different operating conditions. The operator could thus be equipped with a set of different insertion pipes. However, replacement of the insertion pipes in the inlet is an operation which calls for interrupted operation of the cyclone. In these cyclones is each interchangeable insertion pipe optimised for establishing a flow velocity above 30 m/s and preferably at or above 40 m/s. If the flow velocity occasionally drops below a critical flow velocity, and a decreased gas separation is experienced, could either heating of the gas laden liquid stream or alternatively other liquids be added to the gas laden liquid stream in order to maintain the critical flow velocity. Often is steam used as this heating media or added other liquid. This would result in an increase in steam consumption and increase of costs. It is also contra productive to add steam into a process having the objective to separate steam. Said steam separated is most often to be used for heating chips before being fed to the digester. Any decrease in steam production from the cyclone calls for usage of expensive fresh steam that could be used for other purposes. Decreased gas separation is often experienced in pulp mills cooking wood chips from pine or spruce, i.e. softwood, where the spent liquor has a high content of foam producing extractives.

SUMMARY OF THE INVENTION

The aim of the following invention is to produce a cyclone which at least in the main eliminates the abovementioned problem, so that a cyclone is made available, with the aid of which it is possible in a flexible manner during operation of the cyclone to adapt the inlet arrangement to prevailing operating conditions so that the outflow rate inside the cyclone can be optimised and that such an inlet arrangement is constructed in such a manner that it counteracts the appearance of foam.

The abovementioned aim is achieved with the aid of an inlet arrangement which consists of at least one additional insertion pipe arranged in the inlet opening and connected to the common supply source, and one sensor arranged to detect a parameter representative for the order of flow from the common supply source and said sensor connected to a control member for controlling the position of a valve member in at least one insertion pipe depending on the order of flow from the common supply source.

Each insertion pipe has preferably an essentially constant and smooth cross-sectional area, the length of which exceeds 1 meter. In the preferred case, the length of said insertion pipe exceeds 2 meters, and it has proved to be particularly advantageous in connection with pressure release of spent cooking liquid from a digester for pulp production if the insertion pipe has a length of between 2.5 and 3.5 m.

With the aid of at least two insertion pipes, it is possible to control flow velocity in the insertion pipes above a critical value also at lower flow rates by simply shutting off the flow in at least one insertion pipe, by closing a valve member arranged in the upstream end of the additional insertion pipe as seen from the outlet mouth of the additional insertion pipe and having a length of greater than 1 meter between the valve member and the outlet mouth of the additional insertion pipe.

In a preferred embodiment is also the gas outlet in the cyclone for separated gas including a lower end within said casing, and wherein said insertion pipe includes an inner end within said casing, said inner end of said insertion pipe being located above said lower end of said gas outlet.

In order to maintain also a high flow velocity in the outlet pipe for separated gas is the gas outlet including at least 2 outlet pipes arranged coaxially. The flow in at least one outlet pipe is controlled by a valve member depending on the order of flow from the common supply source.

The foam formation is reduced in connection with outflow from the insertion pipes inside the cyclone, also when the flow volumes drops, and that the foam which is formed is "broken up" with the aid of the centrifugal force. The reason for this is that in this manner a sufficiently long "recovery distance" is created for the gas laden liquid stream for recreating an even flow pattern after a pressure drop which has been caused by any arrangement directly before the inlet into each or any of said insertion pipes. Usually, said arrangement is a valve member, with the aid of which the flow into each insertion pipe and hence into the cyclone is regulated. Such a regulating valve therefore causes a pressure drop which gives rise to turbulence and an uneven flow pattern. Other arrangements also, such as unevenness in connections, can, however, cause such a pressure drop. It is preferred that the last part of the inlet arrangement into the cyclone, i.e. the insertion pipes, is constructed in such a manner that it counteracts the appearance of pressure drop, according to the invention.

According to the inventive method for counteracting foam formation within the cyclone for separating a gas from a gas laden liquid stream having a tendency to foam is the flow of the gas laden liquid stream from a common source directed to at least two insertion pipes in the cyclone. In said insertion pipes is established a flow velocity in the outlet of each inlet pipe well above a predetermined critical flow velocity, and when the flow velocity is decreasing and approaching the critical flow velocity is the flow in at least one insertion pipe closed off, while maintaining flow in at least one other insertion pipe. The critical flow rate established should exceed 30 meters per second, and preferably exceed 40 meter per second. According to the invention is the flow rate established in the order of 30-350 m/s, and preferably 40-400 m/s.

The critical flow velocity could be monitored directly or indirectly. Directly by sensors detecting the actual flow velocity of the gas laden liquid and/or the flow velocity of the flashed steam, or indirectly be calculations based upon the flow and temperature of the gas laden liquid and the prevailing pressure in the flash tank. The latter embodiment requiring three sensors, flow and temperature sensors for the gas laden liquid and a pressure sensor in the flash tank.

In a preferred method is also the flow of the separated gas from the cyclone directed to at least two flow paths in the first outlet opening from the cyclone. The flow velocity established in each flow path should also be well above a predetermined critical flow velocity. When the flow velocity is approaching the critical flow velocity is the flow in at least one flow path in the first outlet opening shut off, while maintaining flow in at least one other flow path in the first outlet.

A preferred area of application for the invention is "flashing" of black liquor, that is to say reduction of the pressure of liquor from a pressurised digester for production of sulphate cellulose pulp, and especially pulp made from pine or spruce (softwood) as softwood is rich in foam producing extractives. Because pressure and temperature in this connection are normally relatively high (approximately 4-12 bar and 140-170° C. respectively), the pressure reduction (flashing) must normally take place in a number of stages and use is often made of a number of series-connected cyclones.

The cyclone is also preferably constructed in such a manner that the final separation of liquid phase and gas phase inside the cyclone is as effective as possible, which can be a problem in particular in connection with high inlet rates. The cyclone could include special arrangements such as a deflector screen around outlet of insertion pipes, or a collar on the gas outlet or anti-swirl plate in the liquid volume in order to avoid liquid accompanying the gas flow out of the cyclone.

The important design feature of the cyclone is that at least two insertion pipes are installed, and that the flow in at least one insertion pipe is shut off when the flow rate decrease below a critical value, The total number of insertion pipes could thus be from 2 and up to 5, and the number of pipes where the flow is shut of is proportional to the flow rate decrease from the common source. In any such control mode could 1 insertion pipes be shut off when the flow rate from the common source decrease to a first threshold value, and thereafter could 2 insertion pipes be shut off when the flow rate from the common source decrease to a second lower threshold value.

The outlet end of the insertion pipes may also end at different peripheral positions within the cyclone, even if a common position is preferable from an erosion point of view as the outlet flow could impinge on a common wear plate inside the cyclone.

A BRIEF DESCRIPTION OF THE DRAWINGS

Figure 2:
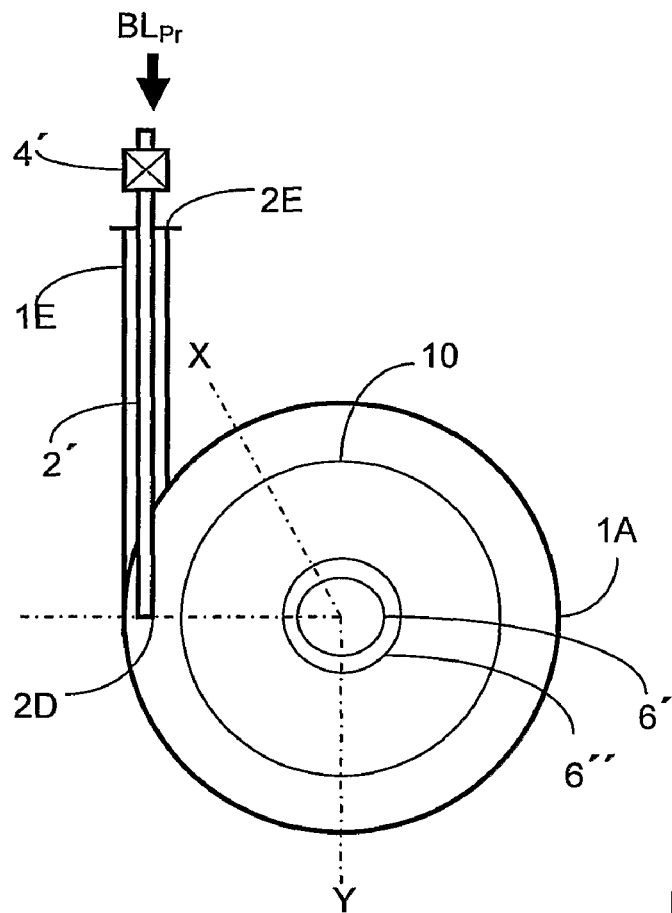
Figure 3:
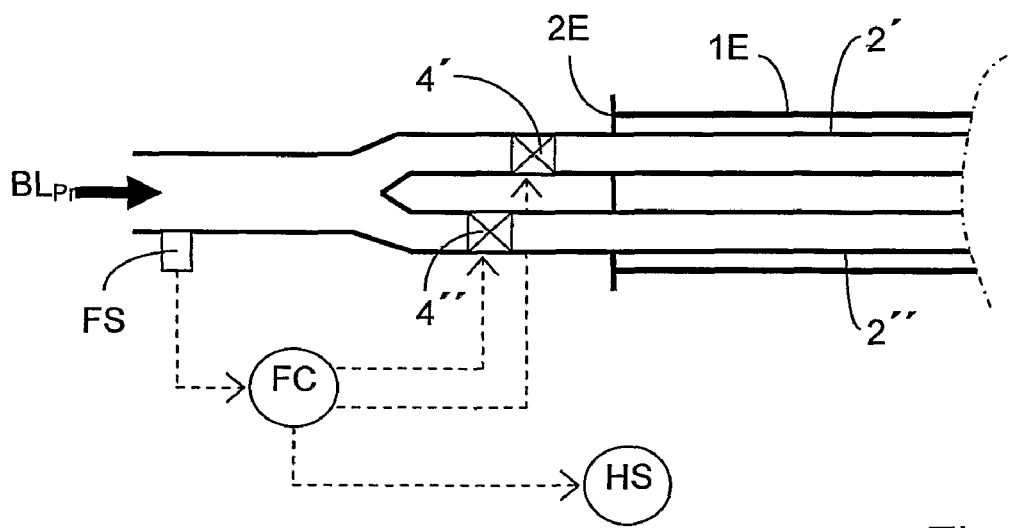

The invention will be explained in greater detail below with the aid of the attached figures, in which:

FIG. 1 shows a partially axially cut-away preferred embodiment of a cyclone according to the invention, FIG. 2 shows a cross-section of a cyclone according to FIG. 1 seen from above along the marking II-II, FIG. 3 shows the inlet opening with its insertion pipes according to the invention.

DESCRIPTION OF THE PREFERRED EMBODIMENTS

In FIG. 1, a cyclone 1 according to a preferred embodiment according to the invention is shown, in which the cyclone walls 1A themselves are of cylindrical design and the bottom IB and top 1C respectively are designed as cupped gables. Two insertion pipes 2', 2" mounted inside a common tubular inlet opening 1E are connected to a common supply source. Via regulating valves 4', 4" (see FIG. 3), it is possible to regulate the inflow of gas laden pressurised liquid into the cyclone 1 in an optimum manner.

The gas separated in the cyclone 1 is conducted out through to a steam duct 6 via coaxial outlet pipes 6' and 6", which are arranged in the top gable 1C. The liquid is conducted out through a lower pipe 5. The mouth 2D of the insertion pipes are positioned in such a manner that it opens above the lower end 6A' and 6A" of the outlet pipes 6' and 6" for the separated gas, for the purpose of preventing liquid from being capable of spraying directly into said inlets 6A' and 6A" in the lower end.

Furthermore, the outer coaxial outlet pipe 6" is preferably provided with a collar 7 in order to prevent drops travelling down along the outside on the pipe 6" and in through the mouth in the lower end 6A".

A further measure for avoiding liquid accompanying the gas flow is the arrangement of an horizontal "anti-swirl plate" 8 which is arranged on radially directed wing shaped vertical pillars 9 directly above the bottom inside the cyclone. Owing to the anti-swirl plate 8 and the wing shaped pillars, the liquid which accumulates in the bottom of the cyclone is prevented from being carried away by the swirl which is formed in the central parts of the cyclone.

In order to further avoid liquid accompanying the gas flow could preferably also a deflector screen 10 be arranged on the inside of the cyclone wall 1A. The deflector screen 10 is of a general "L-shaped" configuration, which opens up downwardly inside the cyclone. The deflector screen 10 is arranged at least in the area of the outlet mouth 2D of the insertion pipes 2' and 2", covering at least the inner circumferential area from a position X some 10-30 degrees before the outlet mouth 2D of the insertion pipes 2' and 2", and to a position Y (see FIG. 2) of at least 45-90 degrees after the outlet mouth 2D of the insertion pipes 2' and 2", as seen in the circumferential direction. In FIG. 2 the deflector screen 10 is indicated to be arranged over the entire circumference, i.e. 360 degrees.

In the embodiment shown in FIG. 1 is also the separated gas from the cyclone directed to at least two flow paths with openings 6A' and 6A" in the first outlet duct 6 from in the cyclone. In order to maintain also a high flow velocity in the outlet from the cyclone for separated gas is the gas outlet including at least 2 outlet pipes 6' and 6" arranged coaxially. The flow in at least one outlet pipe 6' and 6" is controlled by a valve member 4''' depending on the order of flow of produced flash steam.

The flow velocity established in each flow path in the outlet duct should preferably also be well above a predetermined critical flow velocity in order to support the strong swirling action within the cyclone.

When the flow velocity is approaching the critical flow velocity is the flow in at least one flow path in the first outlet opening shut off, while maintaining flow in at least one other flow path in the first outlet. The switching of the valve 4''' between a closed or open position could as shown be made by the same control FC controlling the valves 4' and 4" in the insertion pipes, such that the valve 4''' is closed simultaneously as one of the valves 4' or 4" in the insertion pipes is closed.

In FIG. 2 is the cyclone seen from above in section I-I in FIG. 1. The insertion pipes 2' and 2" are preferably made exchangeable as they are exposed to wear from erosion and also could be replaced with insertion pipes with other dimensions if the typical flow volume handled by the cyclone would dramatically be changed. The insertion pipes 2' and 2" are inserted in a tubular inlet duct 1E of the cyclone.

The insertion pipes 2' and 2" are preferably both arranged in the same vertical plane, one on top of the other. Both insertion pipes 2' and 2" ends preferably at the same insertion depth inside the cyclone and close to a vertical plane lying orthogonally to the direction of the pipes 2' and 2", said vertical plan also intersecting the centre of the cyclone.

Preferably, but not shown, could also a wear plate be mounted on the inside of the cyclone wall in the area of the outlet mouth 2D of the insertion pipes 2' and 2", such that the flow of liquid that is injected at high speed from the mouth 2D impinges on this wear plate and not to the wall of the cyclone.

In FIG. 3 is the inlet duct 1E seen from left in FIG. 1 with the two insertion pipes 2' and 2" located on top of each other. According to the invention are control valves 4' and 4" located in the upstream part of each insertion pipe 2' and 2". With a simple flow control FC, using a flow sensor FS in the piping from the common source $BL_{PR}$, is the valves controlled dependent on the order of flow.

As indicated previously, must in many cases a number of series-connected cyclones by used in order to bring down the pressure to or almost to atmospheric level. In each cyclone could the inventive design be implemented.

The principal control of the flow in the insert pipes is implemented such that the theoretical flow velocity as the liquid exits the mouth 2D of the inserts pipes exceeds 30 m/s, preferably approximately 40 m/s. This design criteria has proven successful in installations of the prior art flash tank according to U.S. Pat. No. 5,669,948 and U.S. Pat. No. 5,879,422 in most mills operated with less deviation from nominal production capacity.

Example of Implementation

In a typical flash cyclone for black liquor received from a continuous digester with an output of 900 tonnes/day, is the internal diameter of the cyclone corresponding to 2.5 m and the effective height of about 6 m. The diameter of each single insertion pipe is 140 mm. With a gas laden liquid stream having a pressure which corresponds to 4-5 bar, and a temperature of 152-159° C., an inlet rate corresponding to approximately 40 m/sec is obtained if the pressure in the flash tank is kept at 2.5 bar (g). This is a typical flash tank pressure in a first flash tank in a system with 3 flash tanks in series.

An inlet rate of 40 m/s is also obtained in a cyclone with single insertion pipe having a single insertion pipe with a diameter of 200 mm at these conditions.

In order to achieve effective utilisation of the centrifugal force in order to "break up foam" in cyclones of these dimensions (diameter greater than 1 meter), the inlet rate should exceed 30 m/s, which is the minimum optimum rate. But improved separation of flash steam is gained also at higher inlet rates in the order of 100-400 m/s.

In a single flash tank system for this order of production could the pressurised gas laden liquid be flashed to a pressure of 0.5 bar inside the flash tank. If a single 200 mm inlet pipe, or using twin inlet pipes according the invention with 140 mm diameter each, could an inlet rate of as much as 250 m/s be established.

In normal steady state operations at the nominal production capacity of the digester is flow in both insertion pipes established. When flow drops below 75% of the nominal production capacity is flow in one of the insertion pipes closed off. The flow rate developed in the remaining insertion pipe will then be maintained well above the critical value. The single activation of one insertion pipe could then maintain a critical flow in the insert pipe well below 50% of the nominal production capacity, and in this example below 40% (about 37%) of the nominal production capacity.

The invention is not limited by the embodiment shown above but can be varied within the scope of the following patent claims. The expert in the field will consequently understand that the shape of the cyclone could be altered (i.e. conical gables VS cupped gables, and cylindrical casing wall VS conical form). Finally, it should be clarified that the length of the insertion pipes means the part of the insertion pipes which actively functions to recreate an even flow pattern after a relatively great pressure drop (such as after a regulating valve), which part normally means the final part of each insertion pipe. Furthermore, it is obvious for the expert in the field that this final part advantageously has an internal surface which is completely smooth/plane in the direction of flow, in order to counteract the appearance of turbulence/pressure drop.

While the present invention has been described in accordance with preferred compositions and embodiments, it is to be understood that certain substitutions and alterations may be made thereto without departing from the spirit and scope of the following claims.

The invention claimed is:

1. A cyclone for separating a gas from a liquid stream, comprising:
    a wall arranged symmetrically around an axis rotation;
    a first end at one end of the axis of rotation, the first end having a first outlet for gas;
    the cyclone having an inlet opening defined therein for the liquid stream, the inlet opening being oriented in a tangential direction of the axis of rotation and extending through the walls of the cyclone;

the cyclone having a second outlet defined therein for liquid in a second end of the cyclone, the inlet opening having a first insertion pipe disposed therein having a constant cross-sectional area and a diameter being smaller than a diameter of the inlet opening, the first insertion pipe being in fluid communication with a supply source ($BL_{PR}$) for the liquid, the first insertion pipe having a first valve member in an upstream end of the first insertion pipe as seen from an outlet mouth of the first insertion pipe and the first valve member being located more than 1 meter from the outlet mouth, at least one additional insertion pipe being arranged in the inlet opening and in fluid communication with the supply source ($BL_{PR}$), at least one sensor (FS) in operative engagement with the supply source ($BL_{PR}$) arranged to detect a parameter representative for an order of flow from the supply source ($BL_{PR}$), and the sensor (FS) being in operative engagement with a control member (FC) for controlling a flow position of the valve member, the flow position being dependent upon the order of flow from the supply source.

2. The cyclone of claim 1 wherein the cyclone further comprises arranging a second valve member in an upstream end of the additional insertion pipe as seen from an outlet mouth of the additional insertion pipe and the second valve member being located more than 1 meter from the outlet mouth of the additional insertion pipe.

3. The cyclone of claim 2 wherein the first insertion pipe has a length greater than 2 meters between the first valve member and the outlet mouth of the first insertion pipe and the additional insertion pipe has a length greater than 2 meters between the second valve member and the outlet mouth of the additional insertion pipe.

4. The cyclone of claim 3 wherein the first insertion pipe has a length of between about 2.5 and 3.5 meters between the first valve member and the outlet mouth of the first insertion pipe and the additional insertion pipe has a length of between about 2.5 meters and 3.5 meters between the second valve member and the outlet mouth of the additional insertion pipe.

5. The cyclone of claim 1 wherein the first outlet has a lower end disposed within the cyclone, and wherein the first insertion pipe has an inner end disposed within the cyclone, the inner end of the first insertion pipe being located above the lower end of first outlet.

6. The cyclone of claim 5 wherein the first outlet is surrounded by a co-axial second outlet, a third valve member in operative engagement with a control member (FC) for controlling a flow position of the third valve member.

7. The cyclone of claim 1 wherein a deflector screen 10 is arranged on an inside of the wall, the deflector screen having a general "L-shaped" configuration.

8. A method for counteracting foam formation within a cyclone for separating a gas from a gas laden liquid stream having a tendency to foam, comprising:

providing a cyclone having an inlet opening defined therein for a gas laden liquid stream, and a first outlet for gas and a second outlet for liquid directing a flow of the gas laden liquid stream from a common source to at least two insertion pipes arrange in the inlet opening, establishing a flow velocity in each insertion pipe above a predetermined critical flow velocity, detecting a decrease in the flow velocity approaching the predetermined critical flow velocity, closing off a valve in operative engagement with at least one of the at least two insertion pipes, and maintaining the flow velocity in at least one of the at least two insertion pipes.

9. The method of claim 8 wherein the critical flow rate is within a range of 30-350 m/s.

10. The method of claim 8 wherein the method further comprises directing the flow of the gas from the cyclone to at least two flow paths in the first outlet and establishing a flow velocity in each flow path above the predetermined critical flow velocity.

* * * * *